US008639062B2

(12) United States Patent
Calman et al.

(10) Patent No.: US 8,639,062 B2
(45) Date of Patent: Jan. 28, 2014

(54) ENSURING IMAGE INTEGRITY USING DOCUMENT CHARACTERISTICS

(75) Inventors: Matthew A. Calman, Charlotte, NC (US); Lisa Gibson, Newnan, GA (US); Lowell R. Huff, Manchester, MO (US); James G. Ronca, Decatur, GA (US)

(73) Assignee: Bank of America Corporation, Charlotte, NC (US)

( * ) Notice: Subject to any disclaimer, the term of this patent is extended or adjusted under 35 U.S.C. 154(b) by 1217 days.

(21) Appl. No.: 11/869,123

(22) Filed: Oct. 9, 2007

(65) Prior Publication Data

US 2009/0092309 A1    Apr. 9, 2009

(51) Int. Cl.
| | |
|---|---|
| G06K 9/00 | (2006.01) |
| G06K 9/46 | (2006.01) |
| G06K 9/54 | (2006.01) |
| G06K 9/60 | (2006.01) |
| G06K 9/66 | (2006.01) |
| G06F 21/00 | (2013.01) |
| G06F 17/30 | (2006.01) |
| G06F 12/00 | (2006.01) |
| G06F 13/00 | (2006.01) |
| G06F 13/28 | (2006.01) |
| H04L 9/32 | (2006.01) |

(52) U.S. Cl.
USPC ........... 382/305; 382/100; 382/190; 707/826; 705/50; 711/100; 713/176

(58) Field of Classification Search
USPC ......... 382/100, 101, 135–141, 173, 175, 181, 382/305–306, 190; 705/50, 1.1; 707/821–831; 711/100; 713/150–181
See application file for complete search history.

(56) References Cited

U.S. PATENT DOCUMENTS 5,359,667 A * 10/1994 Borowski et al. ............. 382/138
5,678,046 A   10/1997 Cahill et al.
(Continued)

FOREIGN PATENT DOCUMENTS

| CN | 1492338 A | 4/2004 |
|---|---|---|
| CN | 1885341 A | 12/2006 |
| CN | 101059863 A | 10/2007 |
| EP | 0115189 A1 | 8/1984 |
| JP | 2006155439 A | 6/2006 |

OTHER PUBLICATIONS

Bank of America Corporation, PCT International Search Report, issued in corresponding International Patent Application No. PCT/US2008/085873, Mar. 2, 2009.

(Continued)

*Primary Examiner* — Randolph I Chu
*Assistant Examiner* — Nathan Bloom
(74) *Attorney, Agent, or Firm* — Michael A. Springs; Moore and Van Allen, PLLC; Patrick B. Horne

(57) ABSTRACT

Image integrity in an archive can be verified using document characteristics. Embodiments of the invention provide a way to verify the integrity of a stored document image by determining document characteristics, which can also be embedded in the image file. Before allowing access to the image file by an application, the characteristics data from an image analysis can be compared to either or both of, characteristics information otherwise stored, or embedded characteristics data. The embedded data can optionally be encrypted. In example embodiments the data can include a result of an optical character recognition of contents of the document, a length of data describing the image, a percentage of a specified color of pixels in the image, or a checksum. Example embedding techniques can include those making use of a tagged image file format (TIFF) header, a steganographic watermark, or an image artifact.

18 Claims, 7 Drawing Sheets

(56) References Cited

U.S. PATENT DOCUMENTS

| | | |
|---|---|---|
| 6,181,814 B1 | 1/2001 | Carney |
| 6,351,553 B1 | 2/2002 | Hayosh |
| 6,671,795 B1 | 12/2003 | Marr et al. |
| 7,209,571 B2 * | 4/2007 | Davis et al. ............... 382/100 |
| 2001/0051921 A1 | 12/2001 | Garner, IV et al. |
| 2003/0126444 A1 * | 7/2003 | Wakao et al. ............. 713/176 |
| 2003/0128375 A1 | 7/2003 | Ruhl et al. |
| 2003/0138128 A1 * | 7/2003 | Rhoads ..................... 382/100 |
| 2005/0034054 A1 * | 2/2005 | Tsuyama et al. .......... 715/500 |
| 2005/0038756 A1 * | 2/2005 | Nagel ........................ 705/76 |
| 2005/0071283 A1 * | 3/2005 | Randle et al. ............. 705/75 |
| 2005/0097019 A1 * | 5/2005 | Jacobs ...................... 705/35 |
| 2005/0125296 A1 * | 6/2005 | Tidwell et al. ............ 705/16 |
| 2005/0139670 A1 * | 6/2005 | McGlamery et al. ..... 235/449 |
| 2005/0213805 A1 * | 9/2005 | Blake et al. ............... 382/137 |
| 2005/0283609 A1 * | 12/2005 | Langford .................. 713/176 |
| 2006/0028689 A1 * | 2/2006 | Perry et al. ............... 358/3.28 |
| 2006/0059201 A1 * | 3/2006 | Watanabe .................. 707/104.1 |
| 2006/0117182 A1 * | 6/2006 | Wolff ........................ 713/176 |
| 2008/0016358 A1 * | 1/2008 | Filreis et al. .............. 713/176 |

OTHER PUBLICATIONS

Bank of America Corporation, PCT Written Opinion, issued in corresponding International Patent Application No. PCT/US2008/085873, Mar. 2, 2009.

International Preliminary Report on Patentability mailed Apr. 22, 2010 for International Application No. PCT/US2008/085873.

State Intellectual Property Office of the People's Republic of China. Chinese Office Action dated May 11, 2012. Chinese Application No. 200810177822.1. Name of Applicant: Bank of America Corporation. Chinese Language. 34 pages.

Chen, Ming-ju et al. "A Digital Watermarking of Detecting the Image Integrity Based on DWT." Information and Electronic Engineering. vol. 6, No. 2, Apr. 2008. Chinese Language. 4 pages.

Han, Shui-Hua et al. "Content-based image authentication: current status, issues, and challenges." Int. J. Inf. Secur. (2010) 9:19-32. DOI 10.1007/s10207-009-0093-2. Regular Contribution. Published Online Oct. 8, 2009. © Springer-Verlag 2009. English Language. 14 pages.

Chinese Office Action for Application No. 200810177822.1 dated Jul. 8, 2013 with English Translation.

* cited by examiner

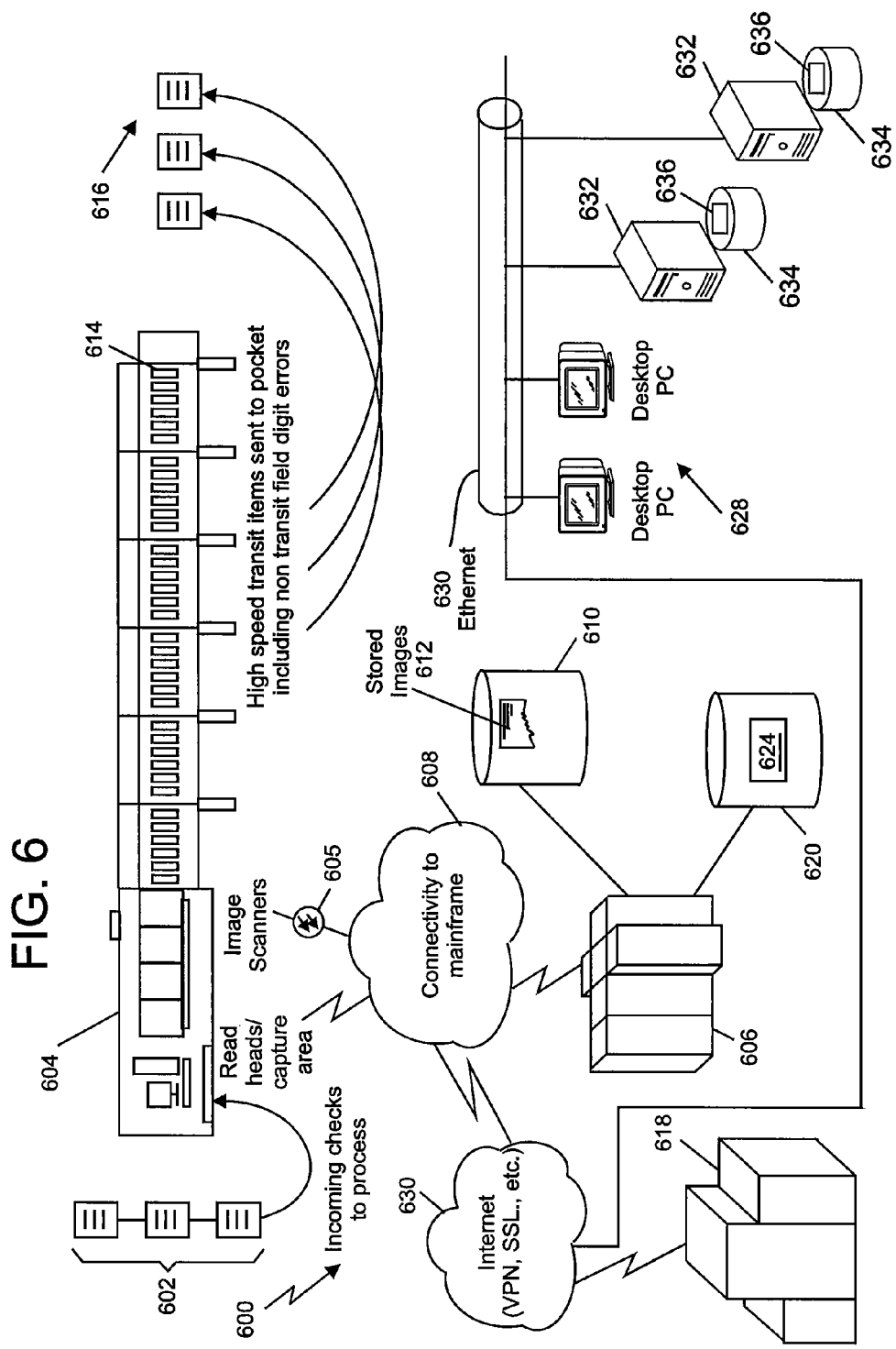

ENSURING IMAGE INTEGRITY USING DOCUMENT CHARACTERISTICS

BACKGROUND

Financial institutions have established various processes related to the exchange of documents evidencing monetary transactions. Such documents have historically been encoded with magnetic ink so that information from the documents can be read by machine. Such documents have thus become known as magnetic ink character recognition (MICR) documents. The MICR information is sometimes called the MICR "codeline" since it appears in a line across the bottom of a check. Check processing and sorting systems have also been developed in which a check or similar MICR document has its image captured and stored electronically. Such an image can be archived so that it is indexed with its accompanying data from the MICR read as well as additional information such as the capture date and time.

In high-speed check processing, errors occur where the image captured for a check is stored and indexed with MICR information for a different account. Typically, such an error occurs due to either a "piggyback" where half of one check overlays another in a sorting and/or imaging system, or an image that was not properly recovered while clearing a jam, thus causing the images and MICR codeline data being processed to lose synchronization. Modern banks typically provide on-line banking systems to customers so that customers can retrieve stored images of their checks. If an image is indexed with incorrect account information, it can be retrieved by the incorrect customer, resulting in a privacy breach.

To detect defects, commercially available image software employs technology to algorithmically analyze images and produce a repeatable result. Such algorithms can determine the length (for example, in bytes) of the image data, percent black pixels, checksums, or the contents of the document in the image (such as the codeline if the document is a check) by optical character recognition. Results of such an analysis can be stored for future reference.

SUMMARY

Embodiments of the invention provide a way to verify the integrity of a stored document image by embedding data about the document's characteristics in the image file and comparing characteristics known from other sources and/or determined in a subsequent analysis to the embedded data for a match prior to display or use of the image by an application or for business purposes.

In some embodiments, a captured image of a document is analyzed to determine at least one image characteristic. Characteristics data describing at least one image characteristic can be embedded in the image file representing the image, and/or characteristics information from the analysis can be otherwise stored for later reference. When an image file is requested for use by an application, for display, or for other purposes, characteristics information stored for the image can be compared with one of embedded characteristics data, newly determined characteristics data from a subsequent analysis (or both), prior to allowing access to the image file. In some embodiments, verification can be carried out by an application requesting the image. This or any other verification can be based on comparing the embedded data with the stored information, or newly determined characteristics data from an image analysis. Such a comparison is especially useful when there is no access to stored characteristics information.

There are numerous ways to embed the information in the image file, depending on the file format being used. In some embodiments, a tagged image file format (TIFF) is used and the information for the image is embedded in a TIFF header. A steganographic watermark and an image artifact such as a perimeter band are other examples of embedding techniques that could be used with an embodiment of the invention. In some embodiments, the documents are financial documents, such as checks or similar MICR encoded documents, and the characteristics can corresponds to an optical character recognition of the MICR codeline for a document.

The characteristics data can optionally be encrypted prior to embedding in the image files. Also optionally, for documents such as checks, the documents can be analyzed to determine a confidence score expressing the likelihood that standard codeline data stored to reference the document matches a codeline in the image prior to carrying out the process of determining and embedding characteristics data in the image file. If the confidence score is too low, the process can be aborted to avoid the risk of putting the wrong document through the rest of the process.

A system used to implement an embodiment of the invention can include an image management platform to obtain image files corresponding to the images, embed characteristics data for an image in image files, and provide the appropriate comparisons, for example, to stored characteristics information for the image. The system in example embodiments can also include an image analysis module functionally connected to the image management platform, at least one application disposed to request the image file and to access the image file and a messaging facility connected between the image management platform and the at least one application.

Computing resources that make up the system of the invention in combination with appropriate computer program code can provide the means to implement an embodiment of the invention by maintaining a storage medium encoded with image files, wherein each image file includes the image itself as represented by image data, and the embedded information about the image.

BRIEF DESCRIPTION OF THE DRAWINGS

FIG. 6 is a detailed system block diagram for an embodiment of the invention that uses the method of FIG. 5.

DETAILED DESCRIPTION OF THE INVENTION

Figure 1:
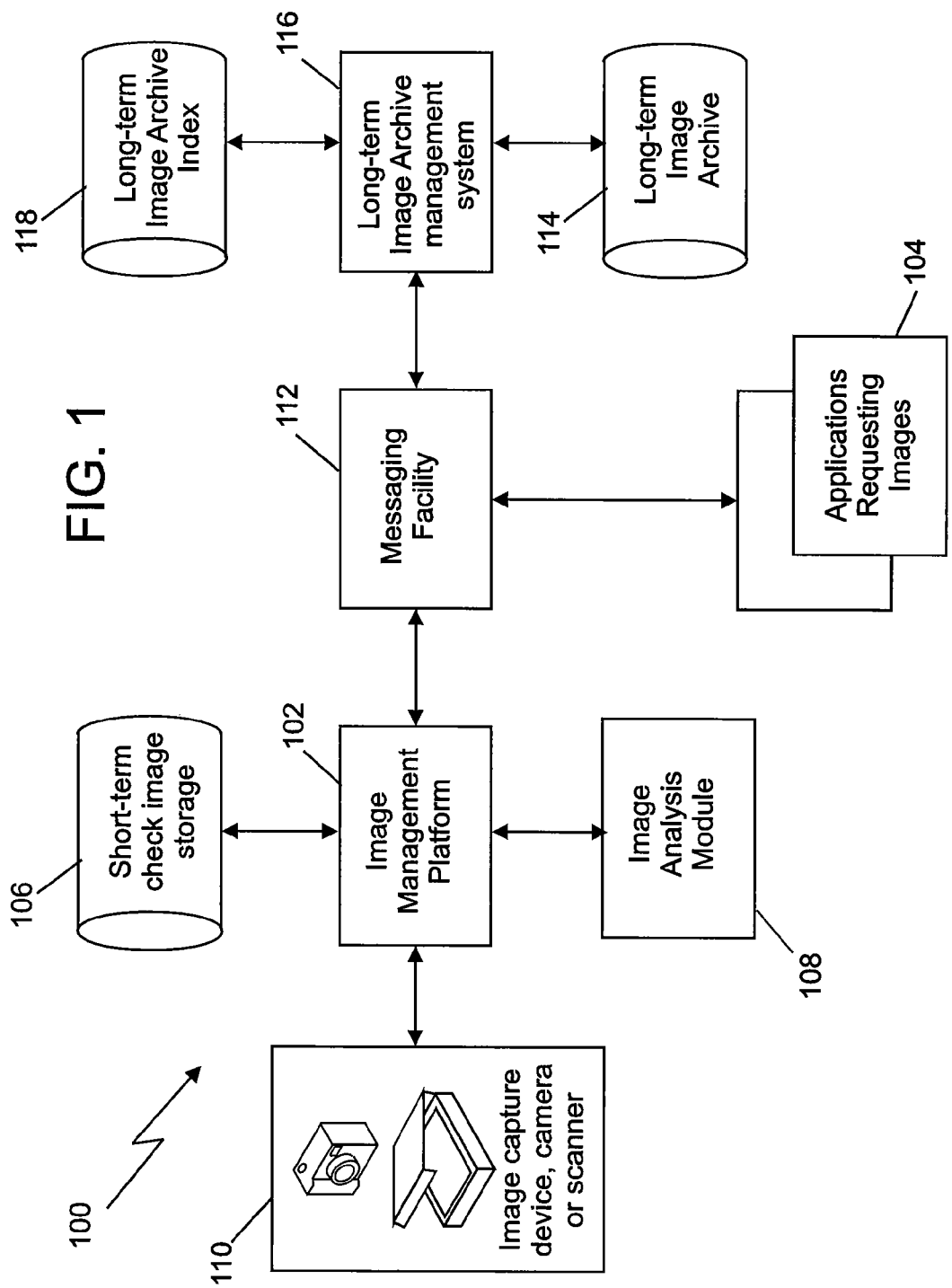
FIG. 1 is a high-level, system block diagram for example embodiments of the invention.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

The term "bank" and any similar terms are used herein in their broadest sense. Financial institutions that process transactions and documents of the types discussed can include stock brokerages, credit unions, and other types of institutions which are not strictly banks in the historical sense. Even retail and other service businesses, as well as manufacturers may process documents and/or data as disclosed herein. The use of terms such as bank, "institution" or "financial institution" herein is meant to encompass all such possibilities.

Much of the terminology herein refers to the processing of information about MICR encoded documents. This data can be stored in a data processing system, in computer memory and/or media for retrieval and manipulation. There are many ways to design a system to accommodate the storage of this information, as well as the storage of electronic images of documents such as checks. For example, this terminology can refer to information stored in what is commonly known as a "check image management system" (CIMS) and within a "check processing control system" (CPCS). Such systems are well known within the banking industry by those who work in the financial data processing fields.

Index information can also be stored with electronic images in an "image cash letter" (ICL) to provide for the truncation of the paper documents. Again, these systems and techniques are well known by those of ordinary skill in the financial information technology arts. Some well-known industry standard formats for a cash letter file that contains both images and all data necessary to index and understand the images are the X9.37i format and the X9.100-180 format, which are promulgated by the American National Standards Institute (ANSI).

Check images as described in some example embodiments can be stored in either or both of a short-term image archive and a long-term image archive. For purposes of the example embodiments described herein, a short-term archive is a repository that houses images and their associated index/electronic data to provide an interim storage facility from which images and image data can be readily accessed and modified by interfacing applications prior to migration to long-term storage. This short-term repository can reside on a mainframe computer system or in a client/server based environment. A long-term image archive is a storage facility that houses images and their associated index/electronic data to provide permanent storage of images and image data, in their final form. The term "permanent" invokes the period of time the image exists in the archive prior to deletion; that time period would be determined by legal, customer, and industry parameters. The long term facility/repository can reside on a mainframe computer system or in a client/server based environment.

It should be noted that the invention can be used with any serialized or indexed documents that include information or document characteristics that can be determined and embedded in an image file for the document itself. The example embodiments presented here related to MICR encoded financial documents processed by typical banking systems. In such a case the document contents and at least some of the stored information corresponds to a MICR codeline. However, this environment is but an example only. An embodiment of the invention prevents an image of any kind of document stored in a file from being used for business purposes, when stored characteristics information, content details about the document, or characteristics data from a subsequent analysis do not match the embedded characteristics data. The information about characteristics of the document stored in an index or elsewhere in a system may be referred to herein as "characteristics information," whereas embedded data, or data produced for possible embedding from an algorithmic analysis may be referred to herein as "characteristics data."

FIG. 1 presents a high-level system block diagram according to example embodiments of the invention. System 100 includes an image management platform, 102, controlling the flow of image transactions through the enterprise, capable of dispatching and receiving data from other applications that might request images, 104, and image storage archives. In at least some embodiments such a platform can be a mainframe computer system with appropriate associated applications such as, in a banking environment, the previously mentioned CPCS and CIMS. Short-term check image storage 106 is for storing images and related data while the images are being handled by the various in-house systems.

Still referring to FIG. 1, image analysis module 108 includes analysis algorithm(s) and may include operator decisioning capability, both used to analyze image data created by capture devices 110. A messaging facility, 112, is provided for communicating between enterprise applications and platforms. This messaging facility can be via secured dedicated communication channels such as a secured intranet or via a secured "pipe" over the public Internet as is known in the art. Long-term image archive 114 and associated management system 116 provide long term image storage. This archive typically also provides images that are reviewed by on-line banking customers. Often, such an archive is maintained by a check archive services provider, as is known in the art. The long term archive management system also has an associated archive index 118, where index information, and in some cases, document characteristics information corresponding to the images can be stored. Information stored in the index can be said to be stored "in association" with an image file stored in the archive.

Figure 2:
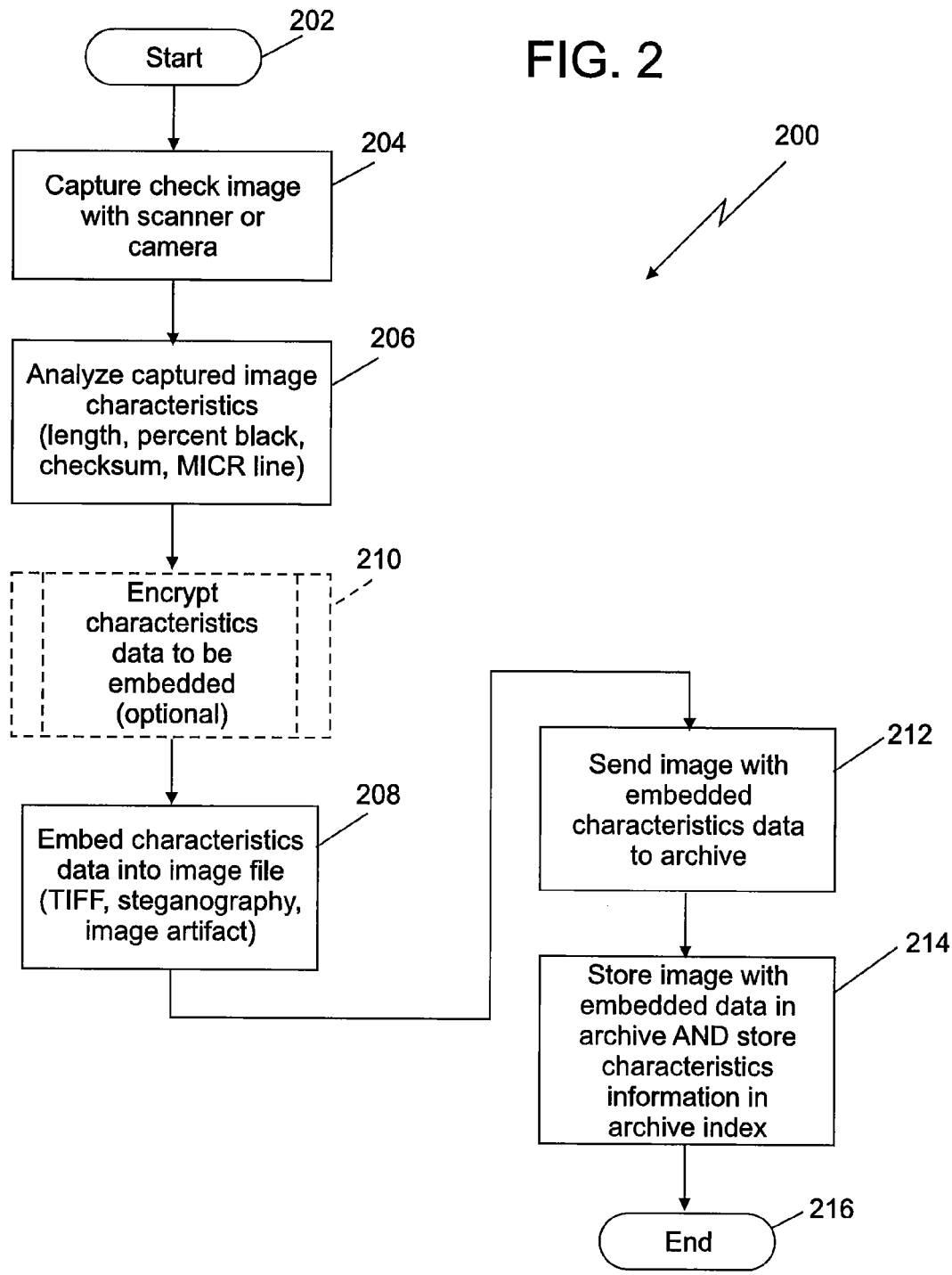
FIG. 2 is a flowchart illustrating the embedding method of the invention according to at least one example embodiment.

FIG. 2 illustrates details of an example embedding and archiving process, 200. Like most flowcharts, FIG. 2 presents process 200 as a series of process blocks, illustrating the various steps and or subprocesses that are performed in example embodiments. Process 200 in FIG. 2 begins at block 202. At block 204, images are captured by an electronic capture device, such as a camera or scanner. At block 206, the images are analyzed for a selected set of characteristics, such as length in bytes, percent black pixels (or pixels of another selected color), document content (such as by optical character recognition (OCR)) or checksum. Characteristics data is embedded in the data object, in this case an image file, at block 208. Optionally, the data to be embedded within the image can be encrypted at block 210 prior to embedding to protect it from access by others, including other parties that may process the image for legitimate purposes. Note that in the case of checks or other financial documents, OCR-determined data could include the MICR codeline.

Encryption in the example of FIG. 2 can be accomplished through a two step encryption mechanism. Embedded data can first be encrypted using a private key selected from a pool of keys, based on, for example, a date. In the case where checks are the documents of interest, the date could be the posting date. Such a technique allows a series of keys to be used for data encryption. The results from that encryption process can then be encrypted again, using a single private key selected from a pool of keys, based on image size. There can similarly be many of these single private keys.

Still referring to FIG. 2, a variety of techniques can be used to embed the data, at block 208. For example, a standard tagged image file format (TIFF) image supports user tags that can be added to a tag directory, allowing user specific information to be retained within the image itself. Further details of example TIFF data embedding techniques will be discussed later with respect to FIG. 4. Other data embedding techniques could be used, including visible and near-invisible image artifacts, such as a perimeter band of pixels, or a digital watermark overlay using steganography. At block 212 the image with the embedded data is sent to the archive for storage. At block 214, the image is stored in an image archive and the characteristics information is stored in the index of the archive. Process 200 of FIG. 2 ends at block 216.

Figure 3:
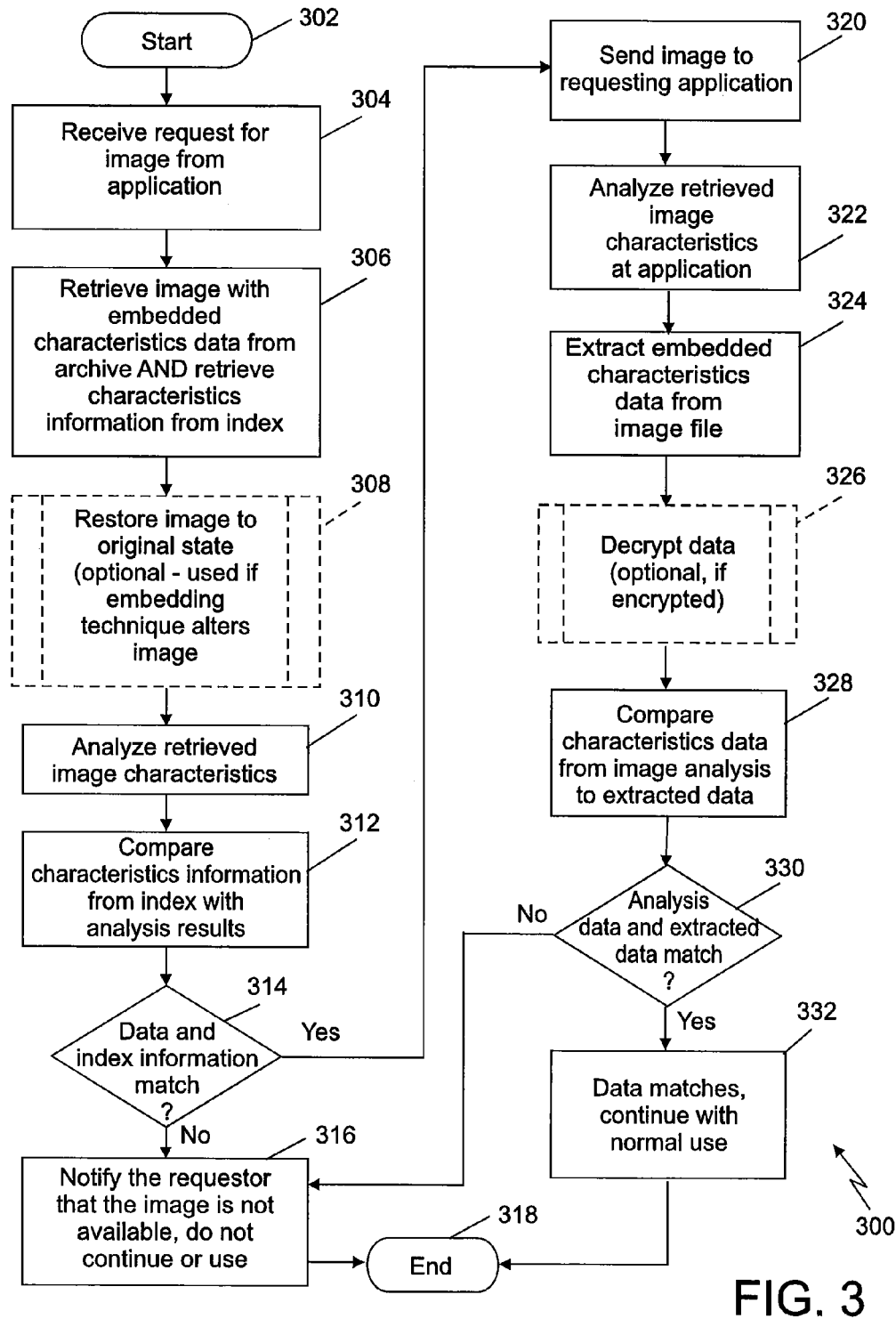
FIG. 3 is another flowchart illustrating details of the comparison process of an embodiment of the invention.

FIG. 3 illustrates an example image retrieval process that makes use of embedded data as described above. Process 300 begins at block 302 of FIG. 3. At block 304 an image is requested for retrieval by any of a variety of applications. At block 306, the image is retrieved from the archive and the descriptive information is retrieved from the archive index. Optionally, if the image was stored with embedded data which altered the image, the image is restored to its original state at block 308. At block 310, the image is analyzed to obtain the same type of characteristics data as obtained when stored. At block 312, the characteristics information from the archive index is compared to the analysis result. If the data matches the information at block 314, assurance is provided that the correct image was retrieved and the image and its embedded characteristics data are provided to the requesting application. If the data does not match, the image retrieval has failed and the retrieved image should not be used to fulfill the request. Processing at block 314 branches to block 316, where the requestor or requesting application may be notified of the problem. The process for such an image would then end at block 318.

Still referring to FIG. 3, the image is sent to the requesting application at block 320. At block 322, the requesting application analyzes the received image for the same set of characteristics as when stored. At block 324, the embedded characteristics data is extracted. If previously encrypted, the data can be decrypted at block 326. The analysis result is compared to the embedded characteristics data at block 328. If the data matches at block 330, assurance is provided at block 332 that the correct image was received and the application can continue with the use of the image file. The process for the current image again ends at block 318. If the data does not match, the image retrieval has failed and the retrieved image should not be used by the application. Processing branches back to block 316 from block 330.

Detailed examples of illustrating how to embed data in image files will now be presented. For purposes of this example, assume TIFF is being used to store images of financial documents. TIFF is treated as a standard within the computing industry. TIFF is a tag based file format for storing and exchanging images, where the images can also include descriptive data in the form of tags. Each tag field contained in a TIFF header describes a different attribute of the image data to follow.

Figure 4:
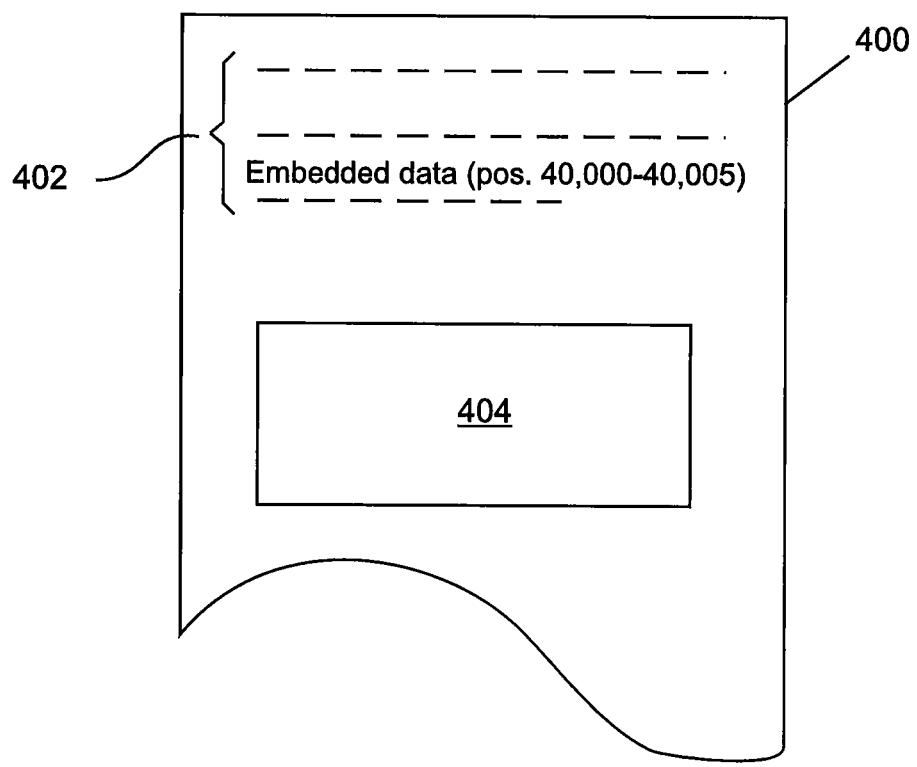
FIG. 4 is a schematic representation of an example image file used with at least some embodiments of the invention.

FIG. 4 is a schematic illustration of an embodiment of an image file, 400, which can be stored on a computer readable storage medium. Image file 400 includes header 402 and image data 404. In example embodiments, the image represents the item that was processed, for example, a check, and may be acquired by scanning. Header 402, in example embodiments of the invention includes the embedded characteristics data in positions 40,000 through 40,005 of the header as indicated in the legend within header 402 of FIG. 4. This data can be disposed within the image file in various places and manners. The details presented here are an illustrative example only.

As a further example based on FIG. 4, assume that an embodiment of the invention is in use where an OCR result of the contents of a check forms the characteristics data. In the notation of the TIFF specification version 6.0, one example of how to lay out the embedded data follows. For each of these fields, dashes and embedded spaces may be retained to allow the MICR line and other information printed or stamped on the check to be accurately represented. A forward slash (/) can be used as a field separator to indicate the end of one field and the beginning of the next.

Posting date:
Tag=40,000
Type=Byte
N=8
Format is YYYYMMDD.
Posting sequence number:
Tag=40,001
Type=Byte
N=number of characters in the sequence number
The posting sequence number in this embodiment is optionally encrypted using a variable key that is dependent on the posting date. In some embodiments, the length of the sequence number can be up to 10 digits.
Posting amount:
Tag=40,002
Type=Byte
N=number of characters in the amount field
The posting amount field is optionally encrypted using a variable key that is dependent on the posting date. This field will contain the numeric amounts and the length in at least some embodiments is a maximum of 10 digits. Note that the amount may or may not be encoded on the MICR line. This value may be adjusted from the MICR line content as a part of data correction procedures.
Posting account number:
Tag=40,003
Type=Byte
N=number of characters in the account number field
The posting account number field is optionally encrypted using a variable key that is dependent on the posting date. The field in example embodiments contains a number and the length in example embodiments is a maximum of 14 digits. Note that the account number may or may not be encoded on the MICR line. This value may be adjusted from the MICR line content as a part of data correction procedures.
Posting routing/transit number (also called the "ABA number")
Tag=40,004
Type=Byte
N=number of characters in the ABA number field
This number field is optionally encrypted in example embodiments using a variable key that is dependent on the posting date. In example embodiments, this field contains the numeric ABA number with an embedded dash if the number is of the "4×4" format. The length is typically 9 digits. Note that the ABA number may or may not be encoded on the MICR line. This value may be adjusted from the MICR line content as a part of data correction procedures.
MICR line:
Tag=40,005
Type=Byte
N=length of character string that represents the MICR line
The MICR line field can be optionally encrypted using a variable key that is dependent on the posting date. This field contains the actual MICR line that was on the check, and contains the following fields which are all optional and may or may not be present (encoded) on the physical check. The ABA field is the transit field and the Aux OnUs filed refers to the standard MICR auxiliary OnUs field, which is used by the financial institution for its own purposes. For example, sometimes the auxiliary OnUs filed is used for the check serial number.
Aux OnUs
External process control field (position 44)
ABA
OnUs
Amount As an alternative to the above, would be to include a sequence of bytes containing fields of dedicated length. For example, the following sequence of bytes could be embedded to carry the data needed. Additional fields could be added for additional information desired.

Figures 5, 5A:
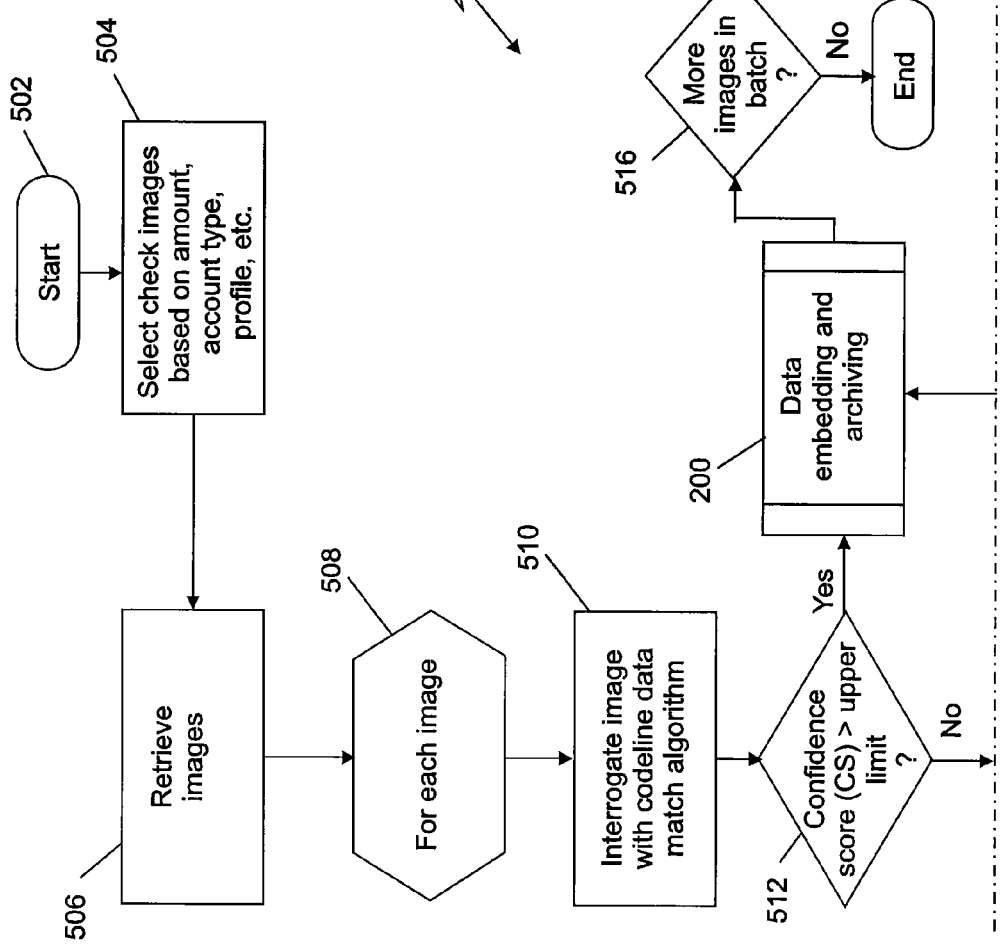
FIG. 5 is another flowchart illustrating a method that can be used with an embodiment of the invention.
Figure 5B:
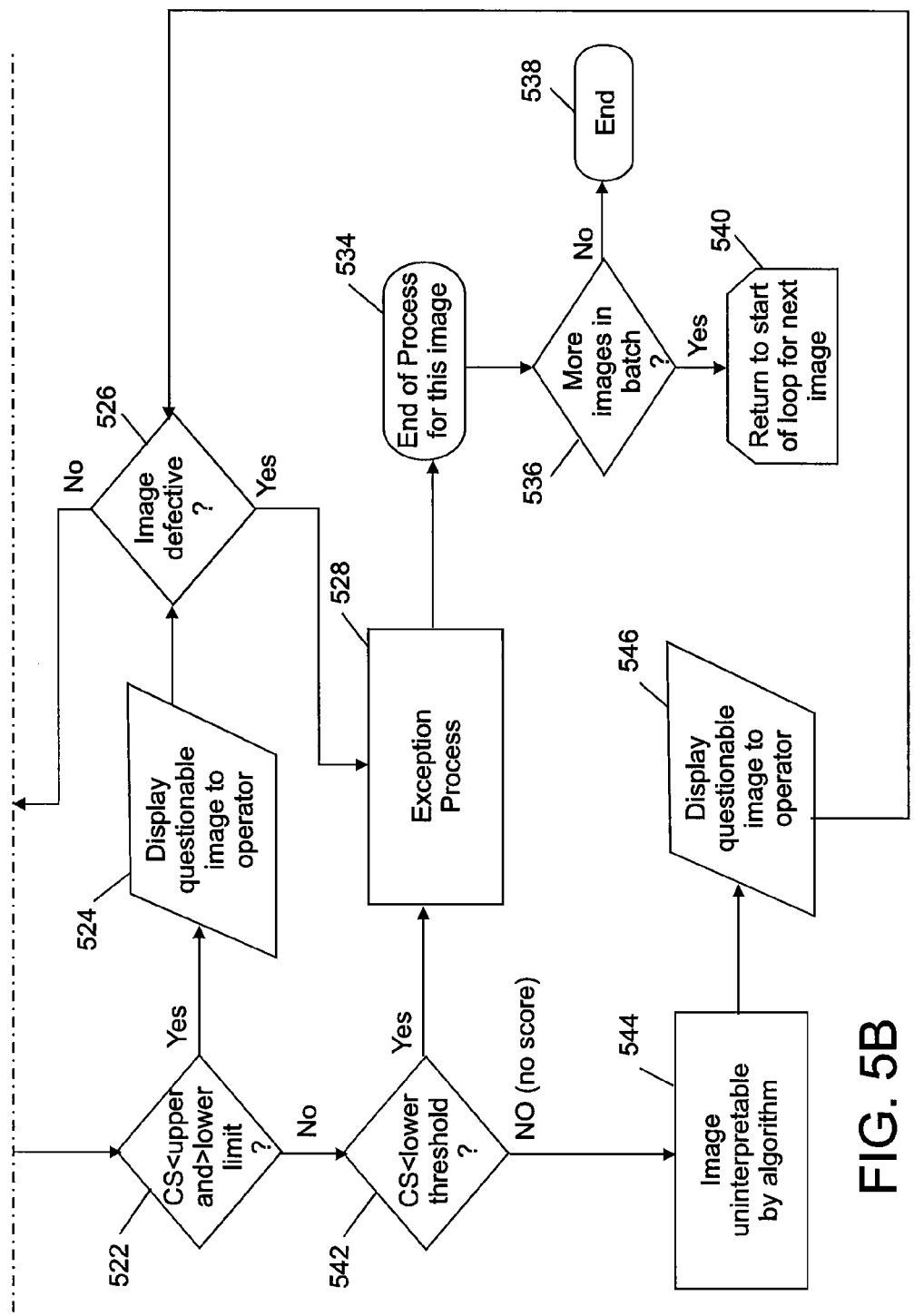

14 bytes-account number
10 bytes-check number
10 bytes-sequence number
11 bytes-amount (cents)
8 bytes-issue date
8 bytes-paid date "YYYYMMDD"
50 bytes-payee name
10 bytes-bank number FIG. 5 is a flowchart showing a process that can optionally be used with some example embodiments of the invention. Where the documents are checks being processed in a banking environment, the process of FIG. 5 can be used to verify a check against MICR information stored in the bank's systems prior to proceeding with the analysis and embedding previously described. Process 500 begins at block 502. At block 504, a population of check images is selected for analysis by the image management platform. This selection may be based on work type, process flow, amount, customer type, or other profile data intended to analyze only the necessary images to satisfy customer requirements. The images are retrieved from short-term check image storage and supplied to the image quality inspection system at block 506.

Still referring to FIG. 5, the remainder of process 500 is repeated for each image of the selected images, as indicated by the "for each image" loop block, 508. This presentation is not meant to suggest that multiple images are not handled in parallel as would typically be the case, depending on available computing resources. At block 510, an image is interrogated with codeline data matching software, resulting in data including the corresponding confidence score for a match. The data is screened for a high confidence threshold value, that is, a value that is above an upper pre-set limit, at block 512. If the confidence score is above that threshold, the data embedding and archiving process 200 according to example embodiments of the invention takes place. The image is not defective. If there are more images to screen at block 516, the process repeats at block 518. Otherwise the process ends at block 520.

Assuming the confidence score is below the limit at block 512 of FIG. 5, the data is screened for a questionable confidence threshold value at block 522. Such a value in this embodiment falls below the pre-set limit but above a pre-set threshold. Such questionable images are passed to an operator to review at block 524 and the operator can determine whether the image is a codeline data mismatch. If not, at block 526, the data embedding and archiving process is again invoked at block 514. Otherwise, if the image is defective, the image becomes the subject of exception handling at block 528.

Exception handling as shown at block 528 of FIG. 5 can take many forms. In some embodiments, data describing the defect can be passed to the archive system and the image can be designated as irretrievable in the image archive without further processing. Alternatively, additional human involvement can take place to try and fix the problem by re-passing the item through the system, manually correcting the data based on human recognition of the image, or the like. Again, the process ends for the current image at block 534. If there are no more images to process at block 536, the process ends at block 538. If there are more images, the process loops back at block 540 to handle the next image.

Still referring to FIG. 5, if the confidence score for the image being handled is not in the intermediate range at block 522, a determination is made at block 542 as to whether the score is below the pre-set threshold. If so, it can be safely assumed the image is defective and the appropriate exception process takes place at block 528, without the need for operator review. Otherwise, a confidence score could not be calculated because the image was not able to be interpreted by the codeline data matching algorithm, and such an indication is made in the system at block 544. In such a case, the image is again displayed to an operator at block 546, and the operator decisioning process previously described takes place at block 526.

It should be noted that the use of the terms "threshold" and "limit" herein is for convenience only, the former being used to refer to the lower confidence score value used in the embodiment of the process shown in FIG. 5, and the latter being used for the upper confidence score value. These values can be set by engineering decision to minimize operator intervention for a given operation. Whether the comparisons made with the actual confidence score include or exclude values equal to the limit and/or threshold is likewise, an engineering choice. A process could also be developed within the scope of the invention that only uses one cut-off value and completely eliminates operator intervention by either accepting a higher rate of unmarked defective images or images falsely designated as defective.

FIG. 6 provides detail of an example check processing environment where an embodiment of the invention might find use. In system 600 of FIG. 6, incoming paper items, in this case checks are shown at 602. The documents are sorted and read at a high-speed sorter, 604. The checks pass through a capture area where read heads capture the MICR data and organize it into stored fields. Images are captured and data 605 is transmitted to computer system 606 via connectivity 608. Computing system 606 serves as the image management platform. Connectivity 608 can be provided by any of various types of networks, for example, an internet protocol (IP) network, or a local area network (LAN). In this example, computing system 606 stores images and data in a short term archive, represented by storage medium 610. An image data object 612, also referred to as an image file according to embodiments of the invention, is schematically represented as stored in short term archive storage medium 610. The paper items, after they have been imaged, are sorted into pockets 614. Sorted, boxed items 616 are then stored, forwarded onto other banks, or otherwise properly routed within the financial institution. It should be noted that in some institutions using exclusively image-based processing, sorted items 616 might be simply stored and eventually destroyed.

Still referring to FIG. 6, connectivity 608 also provides a connection through external means (not shown) to long-term storage archive 618. Information can be forwarded to the long-term archive via a secure connection such as a virtual private network (VPN) connection or a secure sockets layer (SSL) connection. It cannot be over emphasized that the system at FIG. 6 is provided as an illustrative example only. There are numerous types of document sorting systems that can be used to provide the appropriate functions. Most sorters typically have conventional document diverting mechanisms which rout the documents to various pockets. The sorter also captures MICR data, and scans the front and back of documents to capture the appropriate images, which are subsequently analyzed to obtain the characteristics data. Also, the long term archive may not be external, but may be internal to the enterprise, even directly connected to the computer system that implements the image management platform. Although computing platform 606 in FIG. 6 is schematically illustrated as a "mainframe" computer, the computing platform could also be a server, workstation, or even a desktop or handheld computer given the processing power that has been achieved in such devices in recent years.

In FIG. 6, another storage medium, 620, can include computer program code 624, which carries out at least a portion of an embodiment of the invention. Also in FIG. 6, a number of operator terminals, 628, are interfaced to computer system 606 by Ethernet 330. These operator terminals are used to review images in the case where a confidence score for an item is in the intermediate range as previously discussed. Also connected to Ethernet 330 are servers 632, having associated storage media, 634, on which computer program code 636 resides. These servers and the associated computer program code serve as image quality inspection platforms. In at least some embodiments, servers 632 are implemented as Windows™ based platforms, and include computer program code to determine when and how to route images to operators, and to send messages with corrected data back to computer system 606 via appropriate network connections. Computer program code 624 works with other computer program code in the system as well as the appropriate hardware platforms to carry out the analysis, data embedding, and archiving of example embodiments of the invention. This computer program code can also be responsible for exception handling.

Any of various known OCR algorithms can be applied to the processes described above by the servers shown in FIG. 6. Specific OCR products are available that have been designed to optically determine and read printed MICR characters. It is also known how to compare the results of more than one algorithm, or the results of an algorithm with stored values and make determinations regarding certain confidence intervals. One way of accomplishing this is via a voting algorithm. Optical character recognition is a mature art and it is readily understood in the data processing arts how to apply it to achieve various results. Various companies produce OCR products and systems for varied applications. In a typical application, a 60-80% confidence score can be used for a lower limit, and a 95-98% confidence score can be used as an upper limit, particularly when matched to an OCR-compatible font such as the known E-13B font.

The exception handling discussed above can include setting an indication in an archive that an image is irretrievable. The irretrievability and defects in images can be indicated in the same manner as other information is stored in a typical check processing system. MICR information normally includes the various stored data fields, and what in CIMS and CPCS parlance is referred to as a "string" that includes a "user byte." For example, a string designates an item as valid, or as a reject. In an example CPCS system, good items that are sorted to pockets build an "I-String" within CPCS with a valid user byte. Items with errors can build on the same "I-String" but, with other types of CPCS user bytes. These stored strings can be used to indicate when an image has been inspected in the manner described above, and when an image will download to workstations for verification by an operator referencing an image. User bytes can be defined to indicate the defects that caused the problem (for example, piggyback, image quality problem, interruption in processing). User bytes can also define when an image should be designated irretrievable in the long-term archive. This data can be stored in the image management platform in the normal fashion, and then messages can be automatically generated and sent to the long-term image archive to make the appropriate indication in the data structures containing the MICR and other data pertaining to the stored images. The information can be stored and pushed to the archive in a batch fashion, or messages regarding individual items can be sent in real time. Such an exception handling routine is described in commonly assigned U.S. patent application Ser. No. 11/553,269, filed on Oct. 26, 2006, which is incorporated herein by reference.

The confidence data discussed above is the result of the codeline recognition and comparison. When the image quality inspection platform analyzes the optical read of the MICR font, the algorithm may not be 100% certain of a character. For example, the algorithm may not be sure that an '8' is an '8'—perhaps it is a '3'. Because of partial codeline misreads, a small percentage of digits may be permitted to differ between the OCR and MICR reads before an image is flagged as a codeline defect. The algorithm scores the overall match on a confidence scale from 0% to 100%. Users can then set thresholds for various actions to take place. This confidence data has to be stored in order for the image transaction management platform to decide what to do and in order to provide analytical data for problem management and analysis.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method of ensuring integrity of a plurality of images in a document archive, the method comprising:
    receiving, by an image management platform, a captured image of a document, wherein the image comprises image characteristics;
    analyzing, by an image analysis module functionally connected to the image management platform, the captured image of the document to determine the image characteristics associated with the image and storing the captured image of the document as an image file;
    storing, by the image management platform, the one or more image characteristics associated with the image in an index, separate from the image file;
    receiving, at the image management platform and from an application, a request to access the image file associated with the captured image of the document;
    comparing, by the image management platform and in response to the request by the application to access the image file associated with the captured image of a document, the image characteristics stored in the index with image characteristics embedded in the image file to verify the integrity of the image file prior to granting the request by the application to access the image file;
    in response to the image management platform determining that the image characteristics stored in the index match the image characteristics embedded in the image file, sending the image to the application that requested access to the image file;
    analyzing, by the application, the image file to determine the image characteristics associated with the image;
    extracting, by the application, embedded characteristics data from the image file;
    comparing, by the application the image characteristics determined by the application with the characteristics data extracted from the image file by the application; and
    in response to determining that the image characteristics determined by the application match the characteristics data extracted from the image file by the application, verifying, by the application, the integrity of the image file.

2. The computer-implemented method of claim 1 further comprising:
    embedding the image characteristics in form of characteristics data in the image file; and
    subsequently comparing the characteristics data from the image file to one or more of the image characteristics stored in the index to verify the integrity of the image.

3. The computer-implemented method of claim 2 further comprising encrypting the image characteristics prior to embedding the image characteristics.

4. The computer-implemented method of claim 2 further comprising determining a confidence score expressing the likelihood that stored codeline data matches a codeline in the image prior to embedding image characteristics in the image file.

5. The computer-implemented method of claim 2 wherein the image characteristics for the image is embedded in at least one of a tagged image file format (TIFF) header, a steganographic watermark, and an image artifact.

6. The computer-implemented method of claim 1 wherein the at least one image characteristic comprises at least one of, a result of an optical character recognition of contents of the document, a length of data describing the image, a percentage of a specified color of pixels in the image, and a checksum.

7. A non-transitory, computer-readable medium for ensuring integrity of a plurality of images in a document archive, the computer-readable medium having computer program code embodied therein, the computer program code comprising:

instructions for analyzing, using an image management platform, captured images of documents to determine at least one image characteristic for each of the plurality of images, wherein the image is stored as an image file;

instructions for storing, using the image management platform, the at least one image characteristics for each of the plurality of images in an index, separate from the image file; and instructions for comparing, using the image management platform and in response to a request to access the image file by an application, the at least one image characteristic for each of the plurality of images stored in the index with the image stored as the image file in order to verify the integrity of the image file prior to granting the request to access the image file;

instructions for, using the image management platform and in response to determining that the at least one image characteristic for each of the plurality of images stored in the index matches the image stored as the image file, sending at least one of the images to the application that requested access to the at least one image file;

instructions for analyzing, using the application, the at least one image file to determine the image characteristics associated with the at least one image;

instructions for extracting, using the application, embedded characteristics data from the at least one image file;

instructions for comparing, using the application, the image characteristics determined by the application with the characteristics data extracted from the at least one image file by the application; and instructions for, using the application and in response to determining that the image characteristics determined by the application match the characteristics data extracted from the at least one image file by the application, verifying the integrity of the at least one image file.

8. The computer-readable medium of claim 7 wherein the computer program code further comprises instructions for encrypting the at least one image characteristic.

9. The computer-readable medium of claim 7 wherein the documents comprise checks.

10. The computer-readable medium of claim 7 further wherein the computer program code further comprises instructions for embedding the at least one image characteristic in form of characteristics data in the image file using at least one of a tagged image file format (TIFF) header, a steganographic watermark, and an image artifact.

11. The computer-readable medium of claim 7 wherein the at least one image characteristic comprises at least one of, a result of an optical character recognition of contents of the document, a length of data describing the image, a percentage of a specified color of pixels in the image, and a checksum.

12. The computer-readable medium of claim 9 wherein the computer program code further comprises instructions for determining a confidence score expressing the likelihood that stored codeline data matches a codeline in a check prior to embedding characteristics data in the image file.

13. A system for ensuring integrity of a plurality of images in a financial document archive, the system comprising:

an image management platform configured to obtain image files corresponding to images, analyze the images in the image files to obtain image characteristics, store the image characteristics in an index separate from the image files, and compare stored image characteristics for the index with characteristics data from the image files prior to granting a request to access the image file;

an image analysis module functionally connected to the image management platform and configured to determine the image characteristics;

at least one executable application configured to request access to the image file and to access the image file subject to the image management platform comparing stored image characteristics for the index with the characteristics data and subject to the application comparing image characteristics determined by the application with extracted characteristics data;

wherein the at least one executable application is configured to:
in response to receiving the image file from the image management platform, analyze the image file to determine the image characteristics associated with the image;
extract embedded characteristics data from the image file;
compare the image characteristics determined by the application with the characteristics data extracted from the image file by the application; and
in response to determining that the image characteristics determined by the at least one executable application match the characteristics data extracted from the image file by the at least one executable application, verify the integrity of the image file; and a messaging facility connected between the image management platform and the at least one application.

14. The system of claim 13 further comprising a short-term image archive to supply the image files to the image management platform.

15. The system of claim 14 further comprising a long term image archive connected to the messaging facility.

16. The system of claim 15 further comprising a long term image archive index.

17. The system of claim 13 wherein the image characteristics includes at least one of, a result of an optical character recognition of contents of the document, a length of data describing the image, a percentage of a specified color of pixels in the image, and a checksum.

18. The system of claim 13 wherein the image management platform further embeds the image characteristics for the image in the image file using at least one of a tagged image file format (TIFF) header, a steganographic watermark, and an image artifact.

* * * * *